June 17, 1930.  E. S. VANDE MARK  1,764,914
BABY WALKER AND STROLLER
Filed Oct. 3, 1927  2 Sheets-Sheet 1
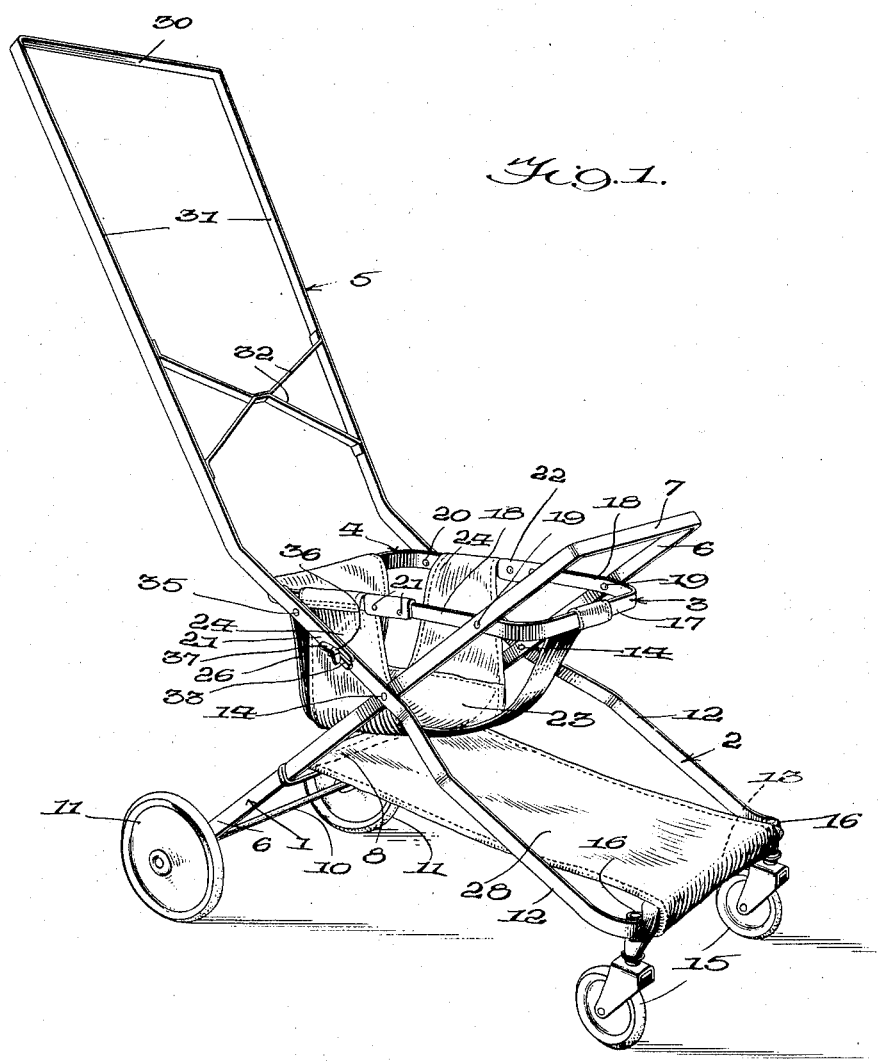
Eugene S. Vande Mark Inventor
By
Attorneys June 17, 1930.  E. S. VANDE MARK  1,764,914
BABY WALKER AND STROLLER
Filed Oct. 3, 1927   2 Sheets-Sheet 2
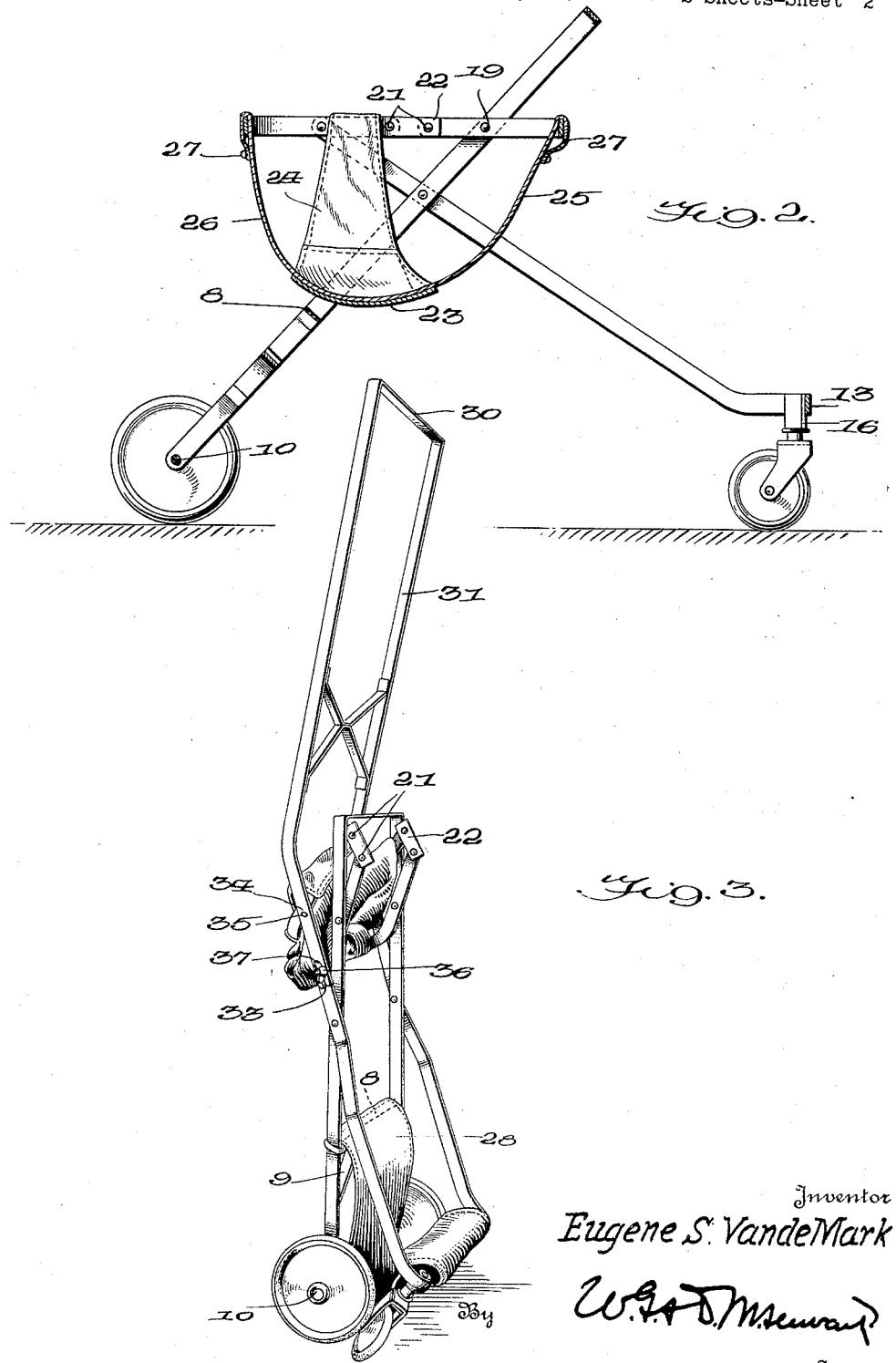

Patented June 17, 1930

1,764,914

UNITED STATES PATENT OFFICE

EUGENE S. VANDE MARK, OF SPRINGMONT, PENNSYLVANIA, ASSIGNOR TO READING SHEET METAL PRODUCTS CO., OF READING, PENNSYLVANIA, A CORPORATION OF PENNSYLVANIA

BABY WALKER AND STROLLER

Application filed October 3, 1927. Serial No. 223,556.

This invention relates to improvements in children's vehicles, and particularly to a combination baby walker and stroller.

The primary object of the invention is to provide a simple inexpensive combined baby walker and stroller which may be readily converted from one form to the other, and may be folded into compact form for transportation and the like.

A further object is to furnish a vehicle of this character having a saddle seat and apron of washable fabric, such seat and apron being removably attached to the frame.

A still further object is to furnish a combined baby walker and stroller, the frame of which is made of strap metal for strength and lightness, and the major elements of which are of U-shape to facilitate manufacture and to expedite folding.

Another object is to provide a child's vehicle having a detachable apron adapted to form a foot rest when the carriage is used as a stroller or go-cart.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a perspective view of the carriage when used as a stroller or go-cart.

Fig. 2 is a vertical sectional view of the same when used as a baby walker, and with the handle removed.

Fig. 3 is a perspective view of the carriage in folded position, and with the stroller handle attached.

The frame of the carriage is preferably made of strap metal and comprises the U-shaped parts 1, 2, 3, 4 and 5.

The part 1 includes the side legs 6 and the cross bar 7, the latter forming a handle for the carriage when it is used as a baby walker. The legs 6 are connected together by a cross bar 8 and braces 9, which are preferably riveted to each other, and to the legs. An axle 10 extends through the lower ends of the legs, and the rear wheels 11 are mounted on this axle.

Element 2 consists of a pair of arms 12, and the cross bar 13; the arms being pivotally connected intermedite their ends at the points 14, to intermediate portions of the legs 6.

Caster wheels 15 are swivelled in brackets 16, which are secured to the cross bar 13 by means of rivets or the like.

The parts 1 and 2 support the seat of the vehicle, and this seat includes the parts 3 and 4. The strap 3 also comprises a cross bar 17, and arms 18, the latter being pivotally connected at 19 to the legs 6.

The rear seat member 4 is pivotally connected at 20 to the upper ends of the arms of the member 2, and the arms of the members 3 and 4 are pivotally connected at 21 to inverted channel irons or hinges 22 which function to hold the members 3 and 4 in alignment when the carriage is in use.

The carriage saddle is preferably formed of canvas or other washable material, and includes a bottom 23 having side tongues 24, a front tongue 25 and a rear tongue 26; these tongues being provided at their upper ends with snap fasteners or the like 27 to detachably secure the saddle in position.

A canvas or other washable apron 28 has its front end detachably connected to the cross bar of the member 2, and its rear end detachably connected to the cross rod of the member 1, and when the carriage is used as a go-cart or stroller, the child sits on the saddle, and rests its feet on this apron.

When the carriage is used as a baby walker, the apron may be removed, and then the child's feet may engage the floor in order to propel the vehicle.

From Fig. 3, it may be clearly seen that the vehicle may be readily folded by simply folding the members 3 and 4 downwardly on their channel-shaped hinges, and at the same time, swinging the members 1 and 2 in such manner on their pivots, that the caster wheels move into engagement with the rear wheels. This movement may take place whether the foot apron is in position or not.

For the purpose of converting the vehicle, just described, into a stroller, or gocart, the handle 5 is provided. This handle consists of the cross bar or handle proper 30, and the side legs 31 which are braced by bent cross rods 32, riveted in position. The lower end of each leg is provided with a notch 33 and an aperture 34, the latter being adapted to engage a pin 35 on the member 2, when the notch engages a threaded pin 36 on said member. Thumb screws 37 are employed to detachably lock the handle in position.

It will be obvious that the vehicle may be folded in the same manner as before, even when the stroller handle 5 is attached, and the foldable feature provides for easy transportation in an auto or train, and compact storage in a closet or some out-of-the-way place.

From the foregoing, it is believed that the construction, operation and advantages of the invention may be readily understood, and it is apparent that changes may be made in the details disclosed without departing from the spirit of the invention as expressed in the claim.

What I claim and desire to secure by Letters Patent is:

In combination with a foldable supporting frame carrying a foldable seat-supporting ring; a fabric saddle seat of substantially cross-shaped outline having the ends of its separated extensions removably secured respectively to opposite sides and the front and rear of said ring, with space between said front and side connections forming leg openings, and a fabric foot supporting apron detachably secured to the forward lower portion of said frame.

In testimony whereof I affix my signature.

EUGENE S. VANDE MARK.